United States Patent [19]
van der Lely

[11] 3,937,285
[45] Feb. 10, 1976

[54] CULTIVATORS

[76] Inventor: Cornelis van der Lely, 7, Bruschenrain, Zug, Switzerland

[22] Filed: Apr. 16, 1974

[21] Appl. No.: 461,376

[52] U.S. Cl. .................. 172/52; 172/68; 172/112; 172/123
[51] Int. Cl.² ........................................ A01B 33/00
[58] Field of Search .......... 172/63, 52, 51, 48, 120, 172/119, 123, 112, 554, 68

[56] References Cited
UNITED STATES PATENTS

| | | | |
|---|---|---|---|
| 980,484 | 1/1911 | Bradley | 172/52 |
| 1,742,563 | 1/1930 | Stidger | 172/119 X |
| 1,842,060 | 1/1932 | Andreasen | 172/52 X |
| 2,044,507 | 6/1936 | Nowlin | 172/52 |
| 3,087,557 | 4/1963 | Hohstadt | 172/123 X |
| 3,557,879 | 1/1971 | van der Lely | 172/112 X |
| 3,739,856 | 6/1973 | Ray | 172/120 X |

*Primary Examiner*—Stephen C. Pellegrino
*Attorney, Agent, or Firm*—Mason, Mason & Albright

[57] ABSTRACT

A cultivator has two elongated rotors rotatably mounted on horizontal axes and in driving engagement with driving means to work the soil at different depths. A forward rotor is secured to the frame and a ground engaging roller is mounted in front of the rotor. A rear rotor has a central multi-sided support on which spacer rings and soil working plates are slideably received. The rear rotor is vertically adjustable with respect to the forward rotor so that the soil can be worked at different layers in one pass.

17 Claims, 3 Drawing Figures

U.S. Patent  Feb. 10, 1976  Sheet 1 of 2  3,937,285

CULTIVATORS

Figure 1:
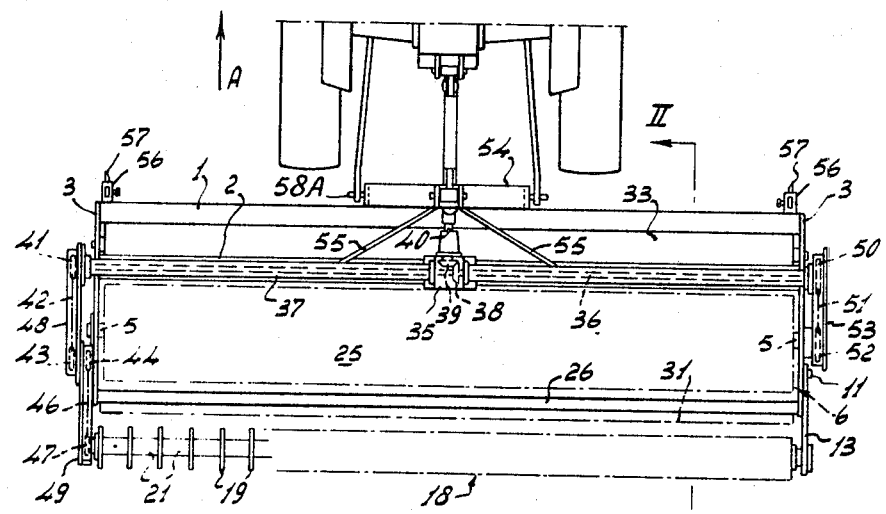
Figure 2:
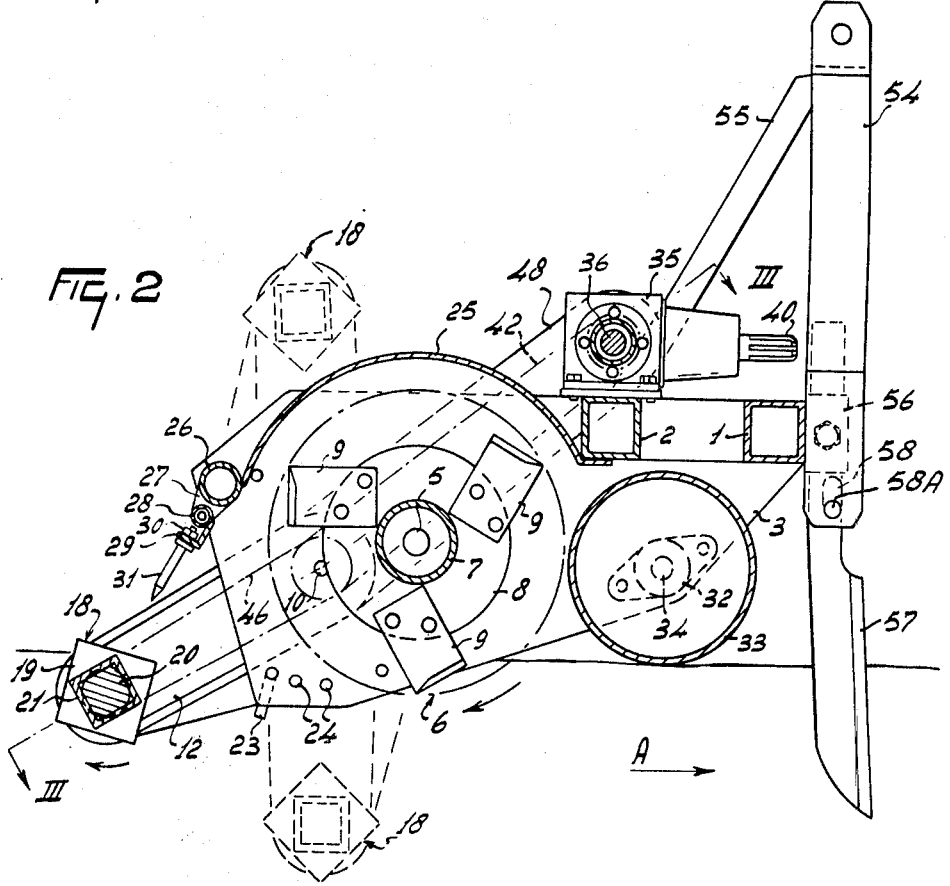
Figure 3:
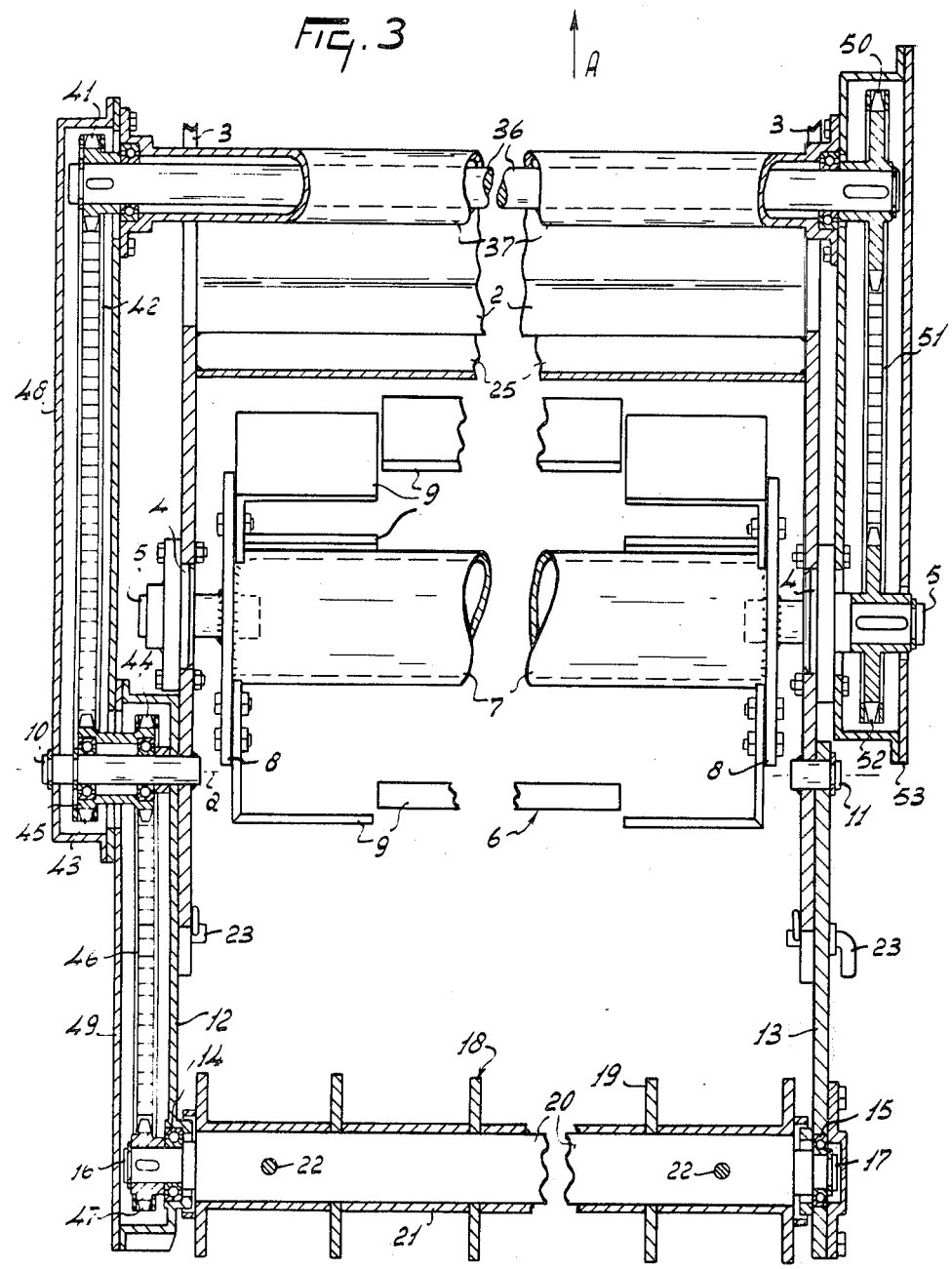

For a better understanding of the invention, and to show how the same may be carried into effect, reference will now be made, by way of example, to the accompanying drawings, in which:

FIG. 1 is a plan view of a soil cultivating implement or cultivator in accordance with the invention mounted at the rear of an agricultural tractor, FIG. 2 is a section, to an enlarged scale, taken on the line II—II of FIG. 1, and FIG. 3 is a section, to a further enlarged scale, taken on the line III—III in FIG. 2.

The soil cultivating implement or cultivator that is illustrated in the accompanying drawings could also be considered as being a rotary plough but, for the sake of brevity, it will be referred to throughout the remainder of this Specification as merely a "cultivator." Referring to the accompanying drawings, the cultivator that is illustrated has a frame comprising two parallel and substantially horizontal beams 1 and 2 that are located one behind the other in spaced relationship in a direction parallel to the intended direction of operative travel of the cultivator that is indicated by an arrow A in the drawings, both beams 1 and 2 being of hollow tubular construction and substantially square cross-section. The beams 1 and 2 are interconnected, at their ends, by substantially vertical plates 3, said plates 3 extending rearwardly with respect to the direction A away from the leading frame beam 1. A soil working rotor 6 is rotatably mounted between the plates 3 at a location to the rear of the frame beam 2 with respect to the direction A, said rotor 6 having axial stub shafts 5 that co-operate with horizontal bearings 4 which are bolted to the two side plates 3. The axis of rotation of the rotor 6 that substantially coincides with the common longitudinal axes of the stub shafts 5 is thus parallel or substantially parallel to the lengths of the two frame beams 1 and 2. The two stub shafts 5 are secured to the opposite ends of a central tubular support 7 of the rotor 6, the connections between the stub shafts 5 and the support 7 being accomplished by substantially vertical plates 8, whose planes are thus substantially perpendicular to the axis of rotation of the rotor, 6, the plates 8 being welded or otherwise rigidly secured to the opposite ends of the tubular support 7 and the stub shafts 5 being welded or otherwise rigidly secured to the centers of the circular plates. A plurality of further plates that are similar to the plates 8 are rigidly secured to the central support 7 at regular intervals along the length thereof, said further plates not being visible in the drawing. However, each of the plates 8 and each of said further similar plates that lie between the plates 8 is substantially perpendicular to the axis of rotation of the rotor 6 and has three soil working blades 9 bolted or otherwise releasably secured to it at 120° intervals around the axis of rotation. The positions of the blades 9 around the axis of rotation are angularly staggered from plate-to-plate along the length of the support 7 so that said blades extend in rows that are wound helically around the axis of rotation of the rotor 6.

Immediately behind the rotor 6 with respect to the direction A, and at a level slightly lower than that of the axis of rotation of said rotor, two substantially horizontal stub shafts 10 and 11 are rigidly secured to the outwardly facing surfaces of the side plates 3 in axially aligned relationship. Arms 12 and 13 are turnably mounted on the stub shafts 10 and 11, said arms 12 and 13 usually extending rearwardly from said stub shafts as indicated in full lines in FIG. 2 of the drawings in respect of the arm 12. The ends of the arms 12 and 13 that are remote from the stub shafts 10 and 11 carry aligned substantially horizontal bearings 14 and 15 which rotatably receive stub shafts 16 and 17 at the opposite ends of a soil working rotor 18. The illustrated rotor 18 is of tubular configuration but could equally well be of a solid non-tubular formation. The rotor 18 is of polygonal cross-section when it is viewed axially (Fig. 2), a square cross-section, as illustrated, being preferred but being by no means essential. A plurality of plates 19 whose planes are disposed substantially perpendicular to the longitudinal axis of the rotor 18 are arranged at regular intervals along the length thereof. The rotor 18 is of bar-like configuration and is constructed by providing a central support 20 of square or other polygonal cross-section, the plates 19 being formed with central matchingly shaped holes so that said plates can be slid axially along the support 20 to their appointed positions, those positions being maintained by interposing spacer sleeves 21 between the plates 19. As can be seen in FIG. 3 of the drawings, the two plates 19 that are located at opposite ends of the rotor 18 are welded or otherwise rigidly secured to the neighbouring sleeves 21, the whole assembly being maintained by passing pins 22 transversely through the end sleeves 21 that have just been mentioned and through the central support 20. The plates 19 are of polygonal shape and are preferably square. As can be seen in FIG. 2 of the drawings, the arrangement is such that the plates 19 are turned through 45° around the axis of rotation of the rotor 18 as compared with the sleeves 21 so that there is a sleeve corner located midway between every two corners of the plates 19 as viewed axially of the rotor 18.

Lowermost and rearmost ends of the side plates 3 with respect to the direction A are formed with a plurality of holes 24 located at equal distance from the common longitudinal axis $a$ of the stub shafts 10 and 11. Locking pins or the like 23 are provided for entry through chosen holes 24 and through co-operating holes in the arms 12 and 13 to maintain those arms in chosen angular settings around the axis $a$ (FIG. 3). The holes 24 that are chosen for co-operation with the locking pins or the like 23 determine the working depth of the rotor 18 and it is noted that the rotor 18 can occupy a position suitable for the inoperative transport of the cultivator in which position it is located generally above the rotor 6. The position which has just been mentioned is indicated in broken lines in an upper region of FIG. 2 of the drawings.

A beam 26 of circular cross-section interconnects the side plates 3 at substantially the rearmost extremities of those plates with respect to the direction A and a curved screening hood or baffle 25 partially surrounds an upper region of the rotor 6 between the plates 3, the leading extremity of said hood or baffle 25 being connected to the frame beam 2 and the rearmost end thereof being connected to the beam 26 that has just been mentioned. Opposite end regions of the beam 26 carry lugs 27 and a support 28 that is parallel to the beam 26 is fastened to said lugs 27. The support 28 has an angle bar 29 of L-shaped cross-section fastened to it in such a way that one limb thereof (as seen in cross-section), (FIG. 2) projects downwardly and rearwardly with respect to the direction A away from the support 28 while the other limb projects upwardly and rearwardly with respect to the direction A away from the integral junction between the two limbs. The second of the two limbs which has just been mentioned is formed with a row of regularly spaced apart holes and straight pointed tines 31 are secured thereto by screw-threaded fastening portions which are entered through the holes and which are maintained in position by fastening nuts 30 that co-operate with flanges or collars of the tines. As can be seen in FIG. 2 of the drawings, the tines 31 project downwardly and rearwardly with respect to the direction A from the angle bar 29.

A soil compressing member or ground roller 33 is rotatably mounted between the side plates 3 at a location in front of the rotor 6 with respect to the direction A by means of aligned horizontal bearings 32 secured to those plates, the bearings 32 receiving axial stub shafts 34 carried at the opposite ends of the roller. The drum-shaped roller 33 is freely rotatable in the bearings 32 and it will be noted from FIG. 2 of the drawings that its outer cylindrical surface is located in very close proximity to the circles traced by the radially outermost extremities of the blades 9 during revolution of the rotor 6. A gear box 35 is fastened to the frame beam 2 at a location midway along the transverse length thereof and a shaft 36 that extends parallel to the beam 2 across the width of the cultivator is entered through the gear box 35. The shaft 36 extends axially through a tubular protective casing 37 that projects from both sides of the gear box 35. The ends of the tubular casing 37 that are remote from the gear box 35 are supported by parts of further protective casings that will be referred to below. The shaft 36 is provided, inside the gear box 35, with a bevel pinion 38 whose teeth are in driven mesh with those of a further bevel pinion 39 mounted on a rotary input shaft 40 that extends substantially parallel to the direction A and whose leading splined or otherwise keyed end projects forwardly from the gear box 35 in that direction. One end of the shaft 36 carries a sprocket wheel 41 from which drive is transmitted to one set of teeth 43 of a twin sprocket wheel 45 by an endless chain 42. The twin sprocket wheel 45 is rotatable by means of ball bearings around the axis $a$ of the stub shaft 10 and a second set of teeth 44 thereof transmits drive to a sprocket wheel 47 carried by the stub shaft 16 by way of an endless chain 46. The sprocket wheel 41, the set of teeth 43 of the twin sprocket wheel 45 and the transmission chain 42 are all surrounded by a protective chain casing 48 to which one end of the tubular casing 37 mentioned above is also bolted. The sprocket wheel 47, the set of teeth 44 of the twin sprocket wheel 45 and the transmission chain 46 are surrounded by a further protective chain casing 49. It will be noted from FIG. 3 of the drawings that one side of the chain casing 49 is afforded by the arm 12 that is angularly adjustable about the axis $a$ of the stub shaft 10.

The end of the shaft 36 that is remote from the sprocket wheel 41 carries a larger sprocket wheel 50 which is linked by an endless transmission chain 51 to a sprocket wheel 52 carried by the stub shaft 5 at one end of the rotor 6. The drive to the rotor 6 is thus located at the opposite side of the cultivator to the drive to the rotor 18. The sprocket wheels 50 and 52 and the chain 51 are surrounded by a protective chain casing 53 to which the end of the tubular casing 37 remote from the sprocket wheel 41 is bolted for support purposes. A coupling member or trestle 54 of generally triangular configuration is rigidly secured to the front of the leading frame beam 1 of the cultivator, downwardly and rearwardly divergent struts 55 being furnished between the apex of the coupling member 54 and locations on the frame beam 2 that are spaced apart from opposite sides of the gear box 35. Sleeve-like holders 56 are provided at the opposite ends of the leading frame beam 1 and at the front thereof with respect to the direction A, said holders 56 receiving upwardly and downwardly displaceable earth-slicing coulters 57. The holders 56 are provided with set bolts to maintain the chosen vertical positions of the coulters 57. The lowermost regions of the generally triangular coupling member or trestle 54 project downwardly below the frame beam 1 and are formed with vertically extending slots 58 arranged to co-operate with substantially horizontal coupling pins 58A in establishing pivotal connections with the free ends of the lower lifting links of a three-point lifting device or hitch carried at the rear of an agricultural tractor or other operating vehicle as can be seen in outline in FIG. 1 of the drawings. Holes are provided in plates at the apex of the coupling member or trestle 54 to establish a pivotal connection with the free end of the adjustable upper lifting link of the same three-point lifting device or hitch. The fact that the coupling pins 58A co-operate with slots 58 enables the cultivator to move relative to the three-point lifting device or hitch of the operating tractor or other vehicle during operation so that undulations in the surface of the ground over which the cultivator is travelling can be matched without difficulty.

In the use of the cultivator which has been described, its coupling member or trestle 54 is connected to the three-point lifting device or hitch of an agricultural tractor or other operating vehicle in the manner that can be seen in outline in FIG. 1 of the drawings and the rotary input shaft 40 of the gear box 35 is placed in driven connection with the power take-off shaft of the same tractor or other vehicle by way of an intermediate telescopic transmission shaft of a construcrion that is known per se having universal joints at its opposite ends. The two rotors 6 and 18 both revolve in the same direction, as indicated by arrows in FIG. 2 of the drawings, which direction is such that the blades 9 of the rotor 6 move through the ground rearwardly with respect to the direction A. The rotor 18 can be placed in a depth setting appropriate to the treatment of the soil that is required which setting will be one of greater working depth than the rotor 6. For example, when the rotor 18 is set at the depth indicated in full lines in FIG. 2 of the drawings, it works a layer of soil immediately beneath the layer worked by the foregoing rotor 6. However, the rotor 18 may be moved to a position in which it will work soil at a greater depth beneath that of the soil worked by the rotor 6. FIG. 2 of the drawings illustrates the deepest working position of the rotor 18 in broken lines at the bottom of the Figure and it will be seen that there is an appreciable vertical spacing between the bottom of the surface layer of top soil worked by the rotor 6 and the top of the deep layer of sub-soil worked by the rotor 18. Using the cultivator with the rotor 18 set at or near its deepest possible working position enables hard layers of sub-soil to be thoroughly broken up and this can greatly improve the water economy of the soil. As seen in cross-section (FIG. 2) the second rotor 18 is polygonal in shape, the plates 19 that are preferably of square cross-section having corners which produce the greatest soil working effect. It is emphasised again that a square configuration for the plates 19 and the central support 20 is by no means essential and that it is possible to employ other cross-section such as triangular, pentagonal and so on. The particular construction of the second rotor 18 that has been described enables any of the plates 19 that become seriously worn or damaged to be replaced without difficulty. It will be evident from the drawings, and particularly from FIG. 2 thereof, that the effective diameter of the second rotor 18 (i.e., the diameter of a circle containing the pointed corners of one of the plates 19 as viewed axially of that rotor) is much smaller than the effective overall diameter of the rotor 6 (i.e., the diameter of the circle that is shown in broken lines in FIG. 2 of the drawings and that is traced by the outermost extremities of the blades 9 during revolution of the rotor). It is, in fact, preferred that the effective diameter of the rotor 6 should be substantially three times that of the second rotor 18. It will be seen from FIGS. 1 and 2 of the drawings that the effective diameter of the second rotor 18 is small as compared with its axial length and this configuration makes it particularly suitable for working deep layers of sub-soil.

The row of tines 31 at the back of the screening hood or baffle 25 is effective in capturing large lumps or clods of soil, stones, root debris and the like and, when the second rotor 18 is in a working position similar to the position threreof that is shown in full lines in FIG. 2 of the drawings, such lumps of soil and so on are deposited in front of that rotor in the cavity cut by the cultivator. The roller 33 that is located in front of the first rotor 6 with respect to the direction A flattens any weeds, stubble or other plant residues that may remain in the ground and facilitates the cutting thereof by the blades 9 of the immediately following first rotor 6. No appreciable quantities of mud or other material can adhere for any length of time to the cylindrical surface of the drum-like roller 33 because such mud or other material is cleared from that surface by the blades 9 which, as previously discussed, move very closely adjacent thereto during the operation of the cultivator. The adjustable coulters 57 at the front of the cultivator cut grooves in the soil to form a clearly defined working strip for the cultivator. Obviously, the distance between the two coulters 57 is substantially equal in magnitude and position to the working widths of the two rotors 6 and 18.

The construction that has been described for the rotor 18 enables it to be assembled or disassembled quickly and easily by a number of simple operations, said rotor 18 being capable of working at any chosen one of a number of soil depths that are different to the working depth of the rotor 6. If required, the cultivator can operate employing only the rotor 6 in which case the second rotor 18 is brought to the inoperative transport position thereof that is shown in an upper region of FIG. 2 of the drawings in broken lines. It is possible to employ the second rotor 18 without the plates 19 in which case the second rotor 18 is still of polygonal cross-section but is of smaller effective diameter. A decision as to whether or not to use the plates 19 will be based upon the particular soil treatment that is required and the nature and consistency of the soil that is to be dealt with but, generally speaking, when the effective diameter of the second rotor is reduced to the diameter of a circle which, in FIG. 2, contains the points of the spacer sleeves 21 or the points of the central support 20 without the spacer sleeves 21, said second rotor 18 is in a condition in which it is particularly suitable for stirring up the sub-soil at a considerable depth below the ground surface.

Although various features of the cultivator that has been described will be set forth in the following claims as inventive features, it is emphasised that the invention is not necessarily limited to those features and that it includes within its scope each of the parts of the cultivator that has been described and/or that has been illustrated in the accompanying drawings both individually and in various combinations.

What we claim is:

1. A cultivator comprising a frame and a first soil-working rotor of bar-like configuration rotatably mounted on said frame with driving means connected to said first rotor, a second soil-working rotor rotatably mounted on said cultivator in driving connection with said driving means, said first rotor having a polygonal periphery, said rotors being located one behind the other and rigid means for fixing the relative positions of said rotors on said frame to work soil at different depths and for positioning said first rotor substantially entirely below the surface of the ground to work sub-soil said first rotor having an effective diameter that is substantially smaller than that of said second rotor.

2. A cultivator comprising a frame and a first soil-working rotor of bar-like configuration rotatably mounted on said frame with driving means connected to said first rotor, a second soil-working rotor rotatably mounted on said cultivator in driving connection with said driving means, said first rotor comprising an elongated support and soil-working means being secured on said support, said rotors being rotatable on corresponding horizontal axes and located one behind the other, rigid means for fixing the relative positions of said rotors on said frame to work soil at different depths and for positioning said first rotor substantially entirely below the surface of the ground to work sub-soil, said first rotor having an effective diameter that is substantially smaller than that of said second rotor.

3. A cultivator comprising a frame and a first soil-working rotor of bar-like configuration rotatably mounted on said frame with driving means connected to said first rotor, a second soil-working rotor rotatably mounted on said cultivator in driving connection with said driving means, said first rotor comprising an elongated substantially horizontal support and soil-working means being releasably secured on said support, said first rotor being located behind the second rotor and rigid means for fixing the relative positions of said rotors on said frame to work soil at different depths and for positioning said first rotor substantially entirely below the surface of the ground to work sub-soil, said first rotor having an effective diameter that is substantially smaller than that of said second rotor.

4. A cultivator as claimed in claim 3, wherein the axis of rotation of said first rotor is fixable to said frame at a lower level than the axis of rotation of said second rotor and said driving means is connected to drive said rotors in the same direction during operation.

5. A cultivator as claimed in claim 3, wherein said first rotor comprrises a central support of polygonal cross-section, soil working plates with spacer sleeves being slideably mounted on said support, said plates being polygonal in configuration.

6. A cultivator as claimed in claim 5, wherein said plates extend substantially perpendicular to the axis of rotation of said second rotor and said plates are square in shape.

7. A cultivator as claimed in claim 5, wherein said plates include plates adjacent opposite axial ends of said rotor which are secured on said support against axial displacement therealong.

8. A cultivator as claimed in claim 3, wherein said first rotor is connected to said frame by arms and the latter are pivotably connected to the frame, adjusting means on said arms that secure said arms and first rotor in a number of different positions with respect to said second rotor and at the rear thereof.

9. A cultivator as claimed in claim 8, wherein the pivotal axis of said arms is located to the rear of said second rotor with respect to the normal direction of travel, said pivotal axis being located at a lower level than the axis of rotation of said second rotor and the latter having a plurality of soil working blades.

10. A cultivator as claimed in claim 9, wherein, as seen in side elevation, said pivotal axis is located inside the path traced by the tips of said soil working blades of said second rotor.

11. A cultivator as claimed in claim 9, wherein said arms and first rotor can be pivoted above said second rotor to an inoperative transport position.

12. A cultivator as claimed in claim 9, wherein a rotary soil compressing member is mounted in front of said rotors with respect to the normal direction of travel, said soil compressing member being freely rotatable about an axis that extends substantially parallel to the axis of rotation of said second rotor.

13. A cultivator as claimed in claim 12, wherein said soil compressing member is a ground roller having a periphery located in close proximity to the paths traced by the soil working blades of the said second rotor.

14. A cultivator comprising a frame and a first soil-working rotor of bar-like configuration rotatably mounted on said frame with driving means connected to said first rotor, a second soil-working rotor rotatably mounted on said cultivator in driving connection with said driving means, said first rotor comprising an elongated support with soil-working means being releasably secured on said support and said rotors being rotatable about corresponding substantially horizontal axes, said rotors being located one behind the other, said first rotor being connected to said frame by pivotable arm means and said arm means being settable to position said first rotor substantially entirely below the surface of the ground to work sub-soil, said second rotor including central support means that is journalled to said frame.

15. A cultivaror as claimed in claim 14, wherein said driving means includes drive transmissions to said first rotor and said second rotor at opposite sides of said cultivator.

16. A cultivator as claimed in claim 14, wherein said frame comprises side plates and the central support of said second rotor is journalled to said side plates, said arm means being pivoted to said side plates whereby said first rotor can be moved in vertical directions with respect to said second rotor.

17. A cultivator as claimed in claim 14, wherein the effective working diameter of said second rotor is about three times the effective working diameter of said first rotor.

* * * * *